(12) United States Patent
Gatzka et al.

(10) Patent No.: US 10,889,176 B2
(45) Date of Patent: Jan. 12, 2021

(54) DRIVE DEVICE FOR A MOTORCYCLE

(71) Applicant: Bayerische Motoren Werke Aktiengesellschaft, Munich (DE)

(72) Inventors: Norbert Gatzka, Eching (DE); Johannes Hoehl, Ortsteil Oberlappach (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/671,212

(22) Filed: Nov. 1, 2019

(65) Prior Publication Data

US 2020/0062103 A1 Feb. 27, 2020

Related U.S. Application Data

(63) Continuation of application No. PCT/EP2018/067281, filed on Jun. 27, 2018.

(30) Foreign Application Priority Data

Aug. 8, 2017 (DE) .................. 10 2017 213 722

(51) Int. Cl.
*B60K 6/38* (2007.10)
*B60K 6/40* (2007.10)
*B62M 7/02* (2006.01)
*F02N 11/12* (2006.01)

(52) U.S. Cl.
CPC .............. *B60K 6/38* (2013.01); *B60K 6/40* (2013.01); *B62M 7/02* (2013.01); *F02N 11/12* (2013.01)

(58) Field of Classification Search
CPC ... B60K 6/38; B60K 6/40; B62M 7/02; F02N 11/12
See application file for complete search history.

(56) References Cited

U.S. PATENT DOCUMENTS

| | | | |
|---|---|---|---|
| 4,558,676 A * | 12/1985 | Seidl | F01L 1/02 123/432 |
| 5,740,877 A * | 4/1998 | Sasaki | B60K 23/0808 180/248 |
| 2006/0213706 A1 | 9/2006 | Gouda et al. | |
| 2015/0149016 A1 | 5/2015 | Saitoh | |

FOREIGN PATENT DOCUMENTS

| | | |
|---|---|---|
| EP | 0 068 336 A1 | 1/1983 |
| EP | 2 639 091 A1 | 9/2013 |
| WO | WO 2011/120547 A1 | 10/2011 |

OTHER PUBLICATIONS

International Search Report (PCT/ISA/210) issued in PCT Application No. PCT/EP2018/067281 dated Nov. 13, 2018 with English translation (seven pages).

(Continued)

*Primary Examiner* — Bryan A Evans
(74) *Attorney, Agent, or Firm* — Crowell & Moring LLP

(57) ABSTRACT

A drive device for a motorcycle is provided. The drive device includes an internal combustion engine having an adapter assembly arranged on a first end face of the internal combustion engine. The adapter assembly on a connection face opposite the first end face at least two connection geometries for different electrical drive units.

14 Claims, 3 Drawing Sheets

(56) References Cited

OTHER PUBLICATIONS

German-language Written Opinion (PCT/ISA/237) issued in PCT Application No. PCT/EP2018/067281 dated Nov. 13, 2018 (five pages).

German Search Report issued in counterpart German Application No. 10 2017 213 722.3 dated Mar. 27, 2018 with partial English translation (11 pages).

"2013 BMW R1200RT", 2013, XP002785967, https://sites.google.com/site/fjrkurt/home/2013-bmw-r1200rt, six pages.

* cited by examiner

DRIVE DEVICE FOR A MOTORCYCLE

CROSS REFERENCE TO RELATED APPLICATIONS

This application is a continuation of PCT International Application No. PCT/EP2018/067281, filed Jun. 27, 2018, which claims priority under 35 U.S.C. § 119 from German Patent Application No. 10 2017 213 722.3, filed Aug. 8, 2017, the entire disclosures of which are herein expressly incorporated by reference.

BACKGROUND AND SUMMARY OF THE INVENTION

The invention relates to a drive device for a motorcycle. In motorcycles, use is usually made of drive devices which are particularly compact. Such drive devices are necessary, in particular, in motorcycles because there is only a very restricted amount of installation space available here. At the same time, there is an increasing need for motorcycles also to be equipped with alternative drives, in particular with hybrid drives comprising an internal combustion engine and an electric motor. This should also be possible within a motorcycle-model range without total reconfiguration necessarily having to be carried out.

It is on this basis that the invention presents a novel motorcycle-drive device which is suitable, in particular, also for forming hybrid systems comprising an internal combustion engine and an electric motor.

These objects are achieved by a drive device for a motorcycle having an internal combustion engine with a first end side and a second end side located opposite the first end side, and an adapter unit with a coupling end side and a connection end side located opposite the coupling end side. The end sides are oriented in each case perpendicularly to spindles and shafts of the internal combustion engine and of the adapter unit. The adapter unit is arranged on the internal combustion engine such that the first end side and the coupling end side butt against one another, and the connection end side has at least two connection geometries for different electric drive assemblies.

The adapter unit is, in particular, a universal adapter which can be used on a modular basis for different drive devices for a motorcycle. The adapter unit makes it possible to realize, with only a low level of additional design outlay, in particular different combinations of the internal combustion engine with different electric drive assemblies.

The internal combustion engine and the adapter unit each have spindles and shafts. These include, for example, the crankshaft and the spindle on which the crankshaft is located. Also included are, for example, shafts and spindles of valve drives, balancer shafts, etc. All the spindles and shafts of the internal combustion engine and of the adapter unit are usually oriented parallel to one another. The end sides (first end side and second end side of the internal combustion engine and also the coupling end side and connection end side of the adapter unit) are oriented perpendicularly, or normal, to said spindles and shafts.

The first end side and the coupling end side are configured in the manner of flange surfaces which correspond with one another and butt against one another, as described, when the drive device has been assembled. The coupling end side of the adapter unit is referred to as a coupling end side because it serves for coupling the adapter group to the internal combustion engine.

The connection geometries are preferably each suitable specifically for a certain type of electric drive assembly. It is also possible, however, for the connection geometries to be of universal configuration, in which case different types of electric drive assembly can be connected to a specific connection geometry. There are preferably at least two, particularly preferably three or more, different connection geometries on the adapter plate, and said connection geometries are each suitable for different electric drive assemblies or for different types of electric drive assembly.

The internal combustion engine is particularly preferably constructed in the manner of a flat engine. Flat engines are of compact overall height and are particularly suitable for use in motorcycles.

At least the following connection geometries are particularly preferably provided on the connection end side:
a first connection geometry for a starter motor,
a second connection geometry for a generator,
a third connection geometry for an electric drive unit,
a connection geometry for a starter generator.

The adapter unit comprises, in particular, means for transmitting mechanical torques from a crankshaft of the internal combustion engine to the aforementioned connection geometries. The connection geometries preferably each comprise a flange, to which a starter motor or a generator or an electric drive unit can be connected such that torques can be transmitted from these components to the crankshaft of the internal combustion engine, and vice versa.

A starter motor, which is connected to the first connection geometry, here is a starter motor by means of which the electric drive unit can be brought into operation. The starter motor here often has a particularly high maximum torque in relation to the power output of the internal combustion engine. In particular, the torque of the starter motor is higher, in relation to the torque of the internal combustion engine, than would be the case, for example, with a drive device for a passenger vehicle. This is due, in particular, to the necessary torque which is required for starting an internal combustion engine for a motorcycle. The small number of cylinders (for example two-cylinder flat engine) means that this torque is often comparatively high. Accordingly, means for transmitting active torques to first connection geometries are preferably designed to transmit large torques (for example greater than 30 percent of the maximum torque of the internal combustion engine). In order that the starter motor need not be of such large dimensions in relation to its power output, there is preferably a step-up transmission unit with a high step-up transmission between the starter motor and the internal combustion engine. The step-up transmission ratio is preferably more than 20:1 and particularly preferably even 30:1 or even higher. Such a step-up transmission unit makes it possible for a comparatively small starter motor to achieve a very high torque. Furthermore, the starter motor (and, in particular, also the adapter unit and the connection geometry) is preferably designed such that high speeds of the internal combustion engine cannot result in the starter motor being impaired or damaged. The maximum speed of the internal combustion engine is preferably comparatively high. The internal combustion engine is preferably one with a maximum operating speed of more than 8000 rpm [rpm=revolutions per minute] or even more than 9000 rpm. In particular on account of the high step-up transmission ratios of the step-up transmission unit, it is therefore possible for the starter motor to be subjected to very high speeds. It is therefore preferable to provide for design measures which can prevent the starter motor from being impaired or damaged by high speeds.

For example, it is advantageous if first connection geometries are provided with an overrunning clutch, which interrupts transmission of power between the first connection geometry and the internal combustion engine as soon as a speed of the internal combustion engine is greater than the speed of a starter motor, which is connected to the first connection geometry. Such an overrunning clutch is a design measure which can prevent the starter motor from being impaired or damaged by high speeds. An alternative to an overrunning clutch would be to design the starter motor such that the latter is suitable for correspondingly high speeds.

A generator, which is connected to the second connection geometry, serves, in particular, to supply electrical energy for electric systems of the motorcycle. Means for transmitting active torques to the second connection geometry are usually of considerably smaller configuration than for the connection geometry. Active torques which are transmitted to a connected generator are preferably uniform (with low-level torque peaks). Accordingly, small dimensioning is possible here.

A drive unit, which is connected to the third connection geometry, has, in particular, the purpose of making a significant contribution to the mechanical propulsion power of the drive device as a whole.

A further connection geometry, which is proposed further above, is a connection geometry for a starter generator. A starter generator is a combined starter motor and generator in one. The connection geometry for the starter generator is preferably, at the same time, one of the other connection geometries mentioned here (first connection geometry, second connection geometry or third connection geometry). The further connection geometry for the starter generator is therefore preferably (just) one possible use of the first connection geometry, of the second connection geometry or of the third connection geometry. There is therefore a total of three connection geometries provided on the connection end side, it being possible for one of these connection geometries to bear two different assemblies (optionally a starter motor, a generator and/or an electric drive unit and a starter generator). It is therefore possible for a maximum of three different assemblies to be connected at the same time.

In a first configuration of the drive device for a motorcycle, it is possible for the adapter unit to have connected to it for example a starter motor to a first connection geometry and a generator to a second connection geometry, while nothing is connected to the third connection geometry. This corresponds to a classic configuration. A motorcycle with a drive device configured in this way is conventionally driven by an internal combustion engine.

In a second configuration, which forms a hybrid drive, it is possible for an electric drive unit to be connected to the third connection geometry. A motorcycle with a drive device configured in this way is a hybrid motorcycle. It is also conceivable to have configurations in which both an electric drive unit is connected to a third connection geometry and a generator and/or a starter motor are/is connected to first and second connection geometries each provided for this purpose. Such configurations are possible, in particular, when the electric drive unit is not suitable for performing the functions of a starter motor and/or the functions of a generator. This is the case, for example, when the electric drive unit is of particularly simple configuration.

All the connection geometries are particularly preferably configured such that different electric drive assemblies can be connected. It is particularly preferable for the adapter unit to have provided on it at least one connection geometry which is suitable both for a starter motor and for electric drive units. Third connection geometries for electric drive units, furthermore, are preferably designed such that electric drive units of different dimensions can be mounted thereon. The "size" of an electric drive unit is intended to mean here, in particular, the dimensioning of the electric drive unit in relation to its propulsion power. Electric drive units with a high level of propulsion power also generate, at the same time, high torques.

The invention is also advantageous if the adapter unit has arranged within it a gearwheel system for transmitting propulsion power from the internal combustion engine to the connection geometries, and vice versa.

Such gearwheel systems then preferably transmit active torques from the internal combustion engine to the respective connection geometries. This gearwheel system is preferably designed to transmit mechanical torques which are at least 30 percent of the maximum mechanical torque of the internal combustion engine.

It has already been proposed above that means for transmitting torques to the first connection geometry (for a starter motor) should be designed such that at least 30 percent of the maximum mechanical torque of the internal combustion engine. The limit of 30 percent proposed here, however, relates not just to means for transmitting torques to the second connection geometry; it preferably also relates to the gearwheel system, which connects all the connection geometries to one another mechanically and/or for torque-transmission purposes. The lower limit of at least 30 percent proposed here means that an even more robust design of the gearwheel system is proposed. All the torque values proposed here relate in each case to an average torque during (continuous) power transmission and not to torque peaks, which can occur briefly for individual revolutions and angles of rotation. In relation to such torque peaks, the gearwheel system is preferably even considerably more resistant and, particularly preferably, can therefore also withstand very much higher torque peaks and/or abrupt torques. It is particularly preferably the case that the gearwheel system is even deigned to transmit mechanical torques which are at least 50 percent of the maximum mechanical torque of the internal combustion engine.

It is thus possible to ensure that the gearwheel system is suitable for transmitting the resultant forces even when a large-dimension electric drive unit is provided on the drive device. It is preferably the case that the means for transmitting active torques in the adapter unit also incorporate means for damping and/or for isolating vastly fluctuating torques—in particular abrupt torques. Such torques can be generated by the internal combustion engine and, depending on how the electric assemblies are embodied, it is advantageous to ensure protection for the electric assemblies by way of damping and/or isolating means. In particular relatively large electric drive units have a large mass moment of inertia, which is regularly accelerated and braked again by fluctuating torques. This results in alternating mechanical loading, which gives rise to serious aging, and possibly also to damage, in the electric drive unit and/or in the connection geometry. This can be prevented by the provision of suitable damping and/or isolating means in the adapter unit.

The drive device is further advantageous if a clutch unit is arranged on the second end side of the internal combustion engine and is intended to transmit mechanical propulsion power of the internal combustion engine to a transmission unit.

The transmission of mechanical propulsion power includes, in particular, the transmission of torques. The clutch unit comprises, in particular, a mechanical clutch, which can control a torque-transmitting connection between the drive units (internal combustion engine and electric drive unit) and the transmission unit.

Accordingly, mechanical propulsion power generated by an electric drive unit fastened on the adapter unit is channelled to the clutch unit, through the internal combustion engine, via the crankshaft of the internal combustion engine. The clutch unit is seated on the opposite connection side of the crankshaft.

The drive device is also advantageous if a transmission unit is arranged laterally beneath the internal combustion engine such that it extends between the first end side and a second end side, wherein an output shaft of the transmission unit extends through an opening provided for this purpose in the adapter unit.

As a result of this arrangement, the drive device forms a particularly compact unit.

The intention here is also to describe a motorcycle having a drive device described above. The motorcycle is distinguished, in particular, in that it is part of a range of motorcycles which comprises motorcycles with only an internal combustion engine and motorcycles with a hybrid drive. It is particularly preferably possible for a motorcycle which has a straightforward internal combustion engine and is equipped with such a drive device even to be retrofitted for hybrid operation.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
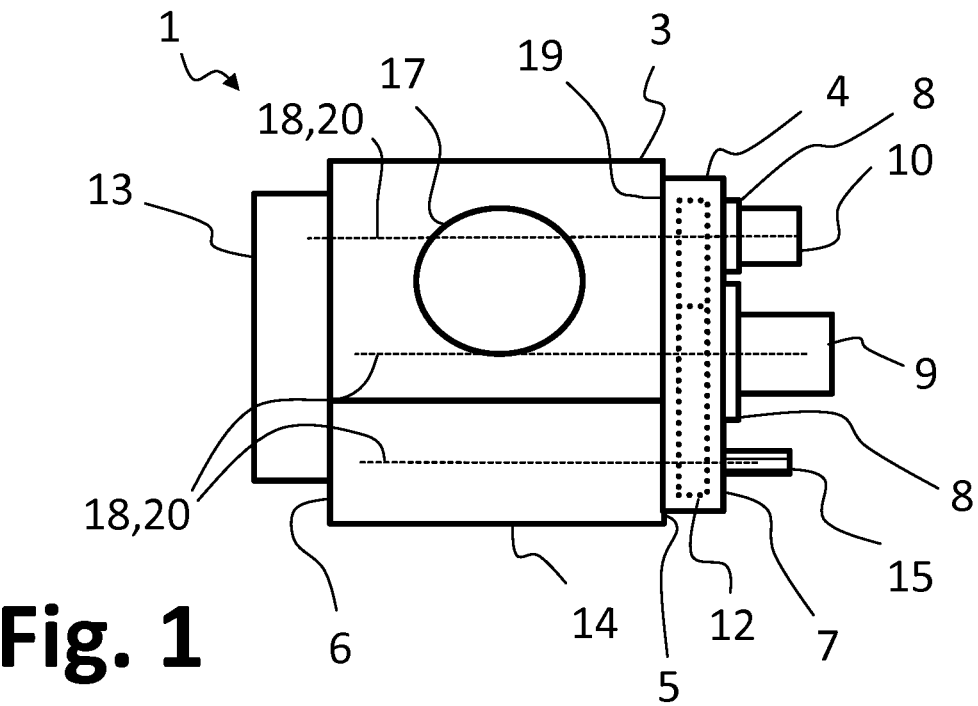
FIG. 1 shows a lateral view of a first configuration of a drive device in accordance with an embodiment of the presented invention.
Figure 2:
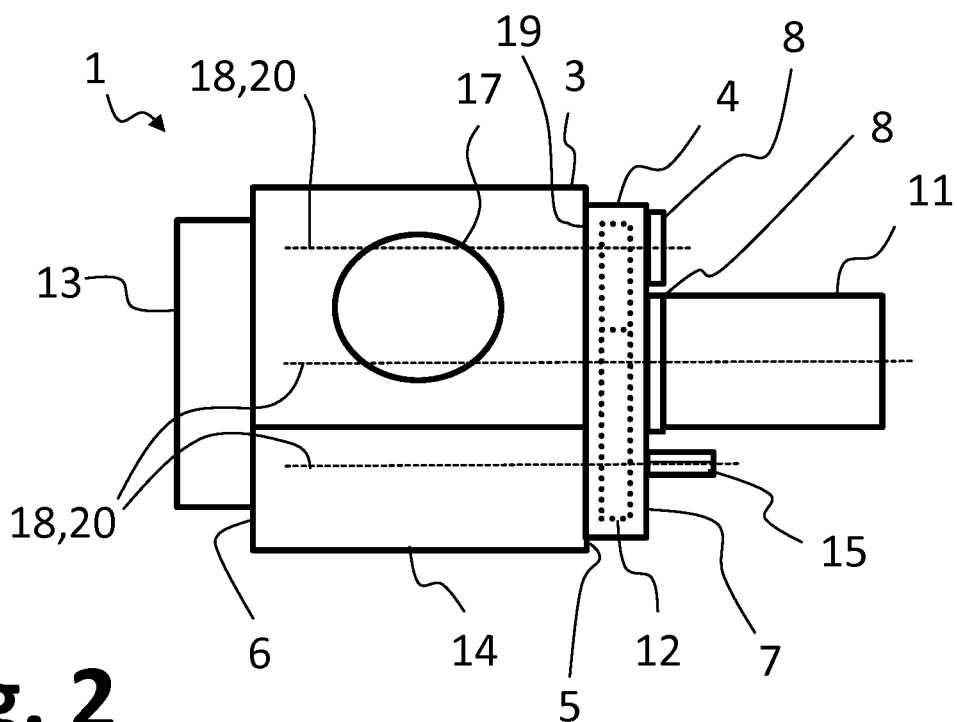
FIG. 2 shows a lateral view of a second configuration of a drive device in accordance with an embodiment of the presented invention.
Figure 3:
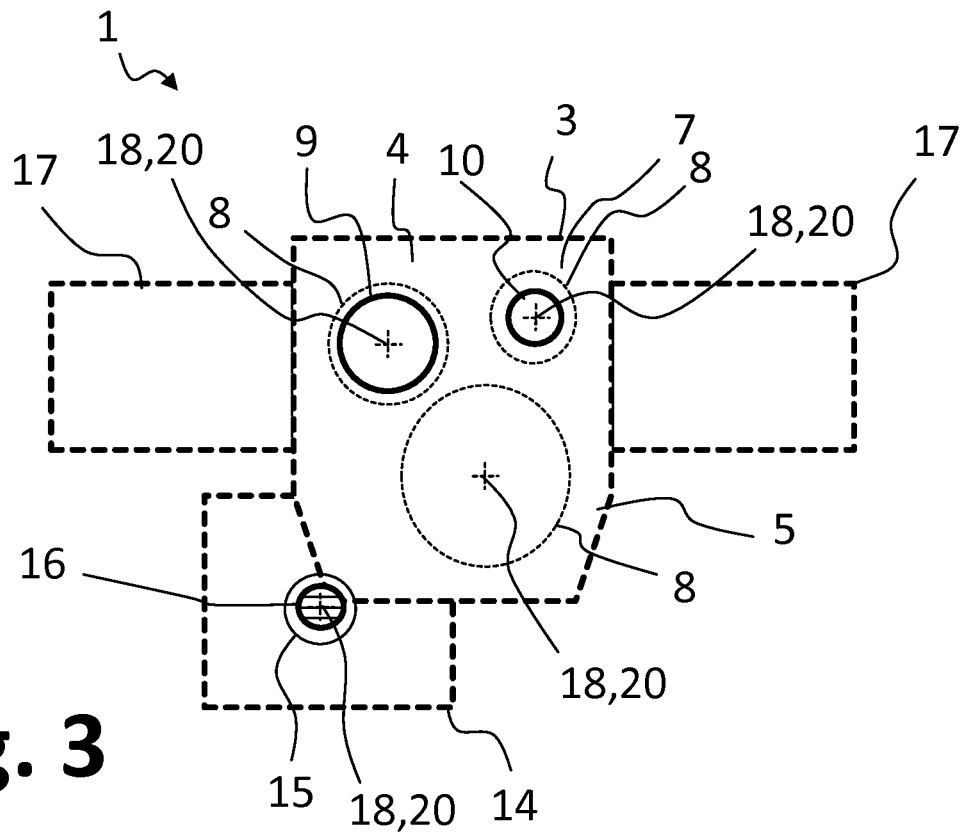
FIG. 3 shows an end view of a first configuration of the drive device of FIG. 1.
Figure 4:
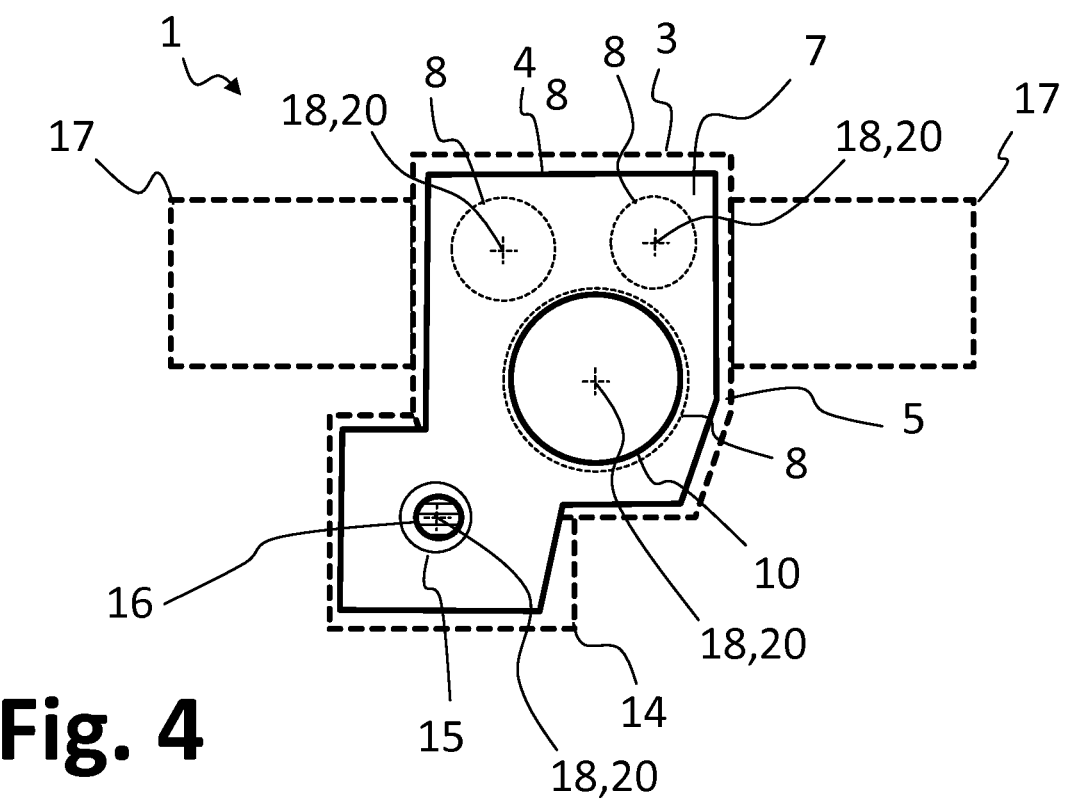
FIG. 4 shows an end view of a second configuration of the drive device of FIG. 2.

FIGS. 1 to 4 show lateral views and end views of different configurations in each case of a drive device 1. FIGS. 1 and 3 show a first configuration, and FIGS. 2 and 4 show a second configuration. It is evident in each case that the drive device 1 has an internal combustion engine 3, on which an adapter unit 4 is arranged on a first end side 5. The adapter unit 4 has a coupling end side 19, which butts against the first end side 5, and a connection end side 7, which is located opposite the first end side 5 or the, and on which are provided connection geometries 8 for the connection of different electric assemblies. These include, for example, a starter motor 9, a generator 10 and an electric drive unit 11. In the first configuration, a starter motor 9 and a generator 10 are provided on the connection geometries 8. In a second configuration, in FIGS. 2 and 4, just an electric drive unit 11 is provided on the connection geometries 8. In both configurations, the internal combustion engine 1 is a flat engine, of which the cylinders 17 are each illustrated schematically here. Located between the cylinders 17 is the crankshaft (not illustrated here), which is connected, for the transmission of power, to gearwheel systems 12 within the adapter unit 4. A clutch unit 13 is arranged on a second end side 6 of the internal combustion engine, said second end side being located opposite the first end side 5, and mechanical power which is generated by the drive device 1 is transmitted by said clutch unit to a transmission unit 14, which is arranged laterally beneath the internal combustion engine 1. An output shaft 15, via which power can be transmitted from the transmission unit to a drive of a vehicle, for example of a motorcycle, extends through an opening 16 of the adapter unit 4. FIGS. 3 and 4 likewise illustrate schematically a mechanical actuator 18, which is arranged on the adapter unit 4 and serves to actuate the transmission unit 14.

Figure 5:
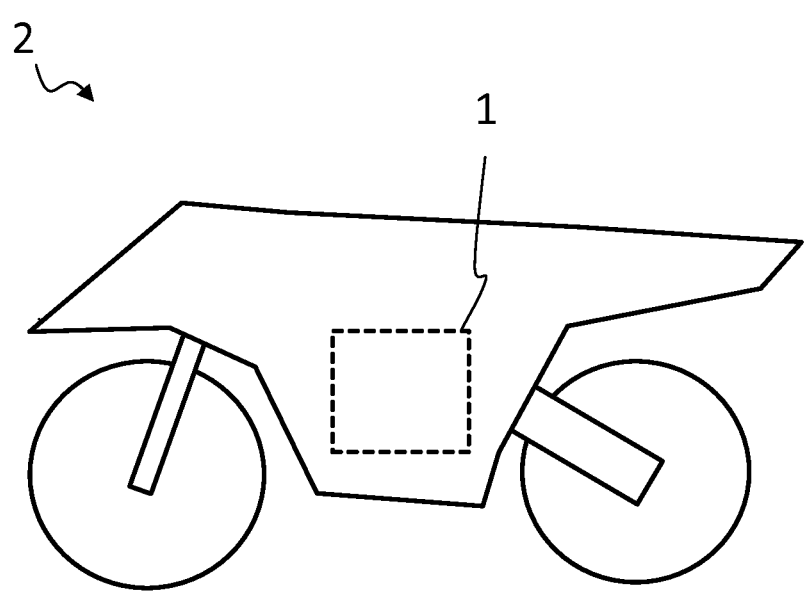
FIG. 5 shows a motorcycle having a drive device in accordance with an embodiment of the presented invention.

FIG. 5 here shows, merely by way of example, a motorcycle 2 equipped with a drive device described above.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE SIGNS

1 Drive device
2 Motorcycle
3 Internal combustion engine
4 Adapter unit
5 First end side
6 Second end side
7 Connection end side
8 Connection geometry
9 Starter motor
10 Generator
11 Electric drive unit
12 Gearwheel system
13 Clutch unit
14 Transmission unit
15 Output shaft
16 Opening
17 Cylinder
18 Shaft
19 Coupling end side
20 Spindle

What is claimed is:
1. A drive device for a motorcycle, comprising:
an internal combustion engine having a first end side and a second end side located opposite the first end side; and
an adapter unit having a coupling end side and a connection end side located opposite the coupling end side, wherein
the end sides of the internal combustion engine and the adaptor assembly are oriented in each case perpendicularly to spindles and shafts of the internal combustion engine and of the adapter unit,
the adapter unit is arranged on the internal combustion engine such that the first end side of the internal combustion engine and the coupling end side of the adaptor assembly abut one another, and
the connection end side of the adaptor assembly has at least two connection geometries for different electric drive assemblies.

2. The drive device according to claim 1, wherein the internal combustion engine is constructed a flat engine.

3. The drive device according to claim 1, wherein the at least two connection geometries on the connection end side of the adapter unit include
a first connection geometry for a starter motor,
a second connection geometry for a generator,
a third connection geometry for an electric drive unit, and
a connection geometry for a starter generator.

4. The drive device according to claim 2, wherein the at least two connection geometries on the connection end side of the adapter unit include:
a first connection geometry for a starter motor,
a second connection geometry for a generator,
a third connection geometry for an electric drive unit, and
a connection geometry for a starter generator.

5. The drive device according to claim 1, wherein the adapter unit includes a gearwheel system configured to transmit torque between the internal combustion engine and at least one of the at least two connection geometries.

6. The drive device according to claim 3, wherein the adapter unit includes a gearwheel system configured to transmit torque between the internal combustion engine and at least one of the at least two connection geometries.

7. The drive device according to claim 5, wherein the gearwheel system is configured to transmit a mechanical torque which is at least 30% of the maximum mechanical torque output of the internal combustion engine.

8. The drive device according to claim 1, further comprising:
a clutch unit arranged on the second end side of the internal combustion engine; and
a transmission unit,
wherein the clutch unit is configured to control transmission of toque from the internal combustion engine to the transmission unit.

9. The drive device according to claim 5, further comprising:
a clutch unit arranged on the second end side of the internal combustion engine; and
a transmission unit,
wherein the clutch unit is configured to control transmission of torque from the internal combustion engine to the transmission unit.

10. The drive device according to claim 6, further comprising:
a clutch unit arranged on the second end side of the internal combustion engine; and
a transmission unit,
wherein the clutch unit is configured to control transmission of torque from the internal combustion engine to the transmission unit.

11. The drive device according to claim 8, wherein the transmission unit is arranged beneath the internal combustion engine between the first end side and a second end side of the internal combustion engine, and
an output shaft of the transmission unit extends through an opening in the adapter unit.

12. The drive device according to claim 9, wherein the transmission unit is arranged beneath the internal combustion engine between the first end side and a second end side of the internal combustion engine, and
an output shaft of the transmission unit extends through an opening in the adapter unit.

13. The drive device according to claim 10, wherein the transmission unit is arranged beneath the internal combustion engine between the first end side and a second end side of the internal combustion engine, and
an output shaft of the transmission unit extends through an opening in the adapter unit.

14. A motorcycle, comprising:
wheels;
an internal combustion engine having a first end side and a second end side located opposite the first end side, the internal combustion engine being arranged to supply torque to at least one of the wheels; and
an adapter unit having a coupling end side and a connection end side located opposite the coupling end side;
a clutch unit arranged on the second end side of the internal combustion engine; and
a transmission unit,
wherein
the end sides of the internal combustion engine and the adaptor assembly are oriented in each case perpendicularly to spindles and shafts of the internal combustion engine and of the adapter unit,
the adapter unit is arranged on the internal combustion engine such that the first end side of the internal combustion engine and the coupling end side of the adaptor assembly abut one another,
the connection end side of the adaptor assembly has at least two connection geometries for different electric drive assemblies,
the adapter unit includes a gearwheel system configured to transmit torque between the internal combustion engine and at least one of the at least two connection geometries, and
the clutch unit is configured to control transmission of torque from the internal combustion engine via the transmission unit to the at least one of the wheels.

* * * * *